UNITED STATES PATENT OFFICE.

WILLIAM CULVEYHOUSE AND EDWIN S. ANDERSON, OF DOVER, DELAWARE.

COMPOSITION FOR STOPPING LEAKS IN CYCLE-TIRES.

SPECIFICATION forming part of Letters Patent No. 599,317, dated February 22, 1898.

Application filed October 5, 1897. Serial No. 654,163. (No specimens.)

*To all whom it may concern:*

Be it known that we, WILLIAM CULVEYHOUSE and EDWIN S. ANDERSON, citizens of the United States, residing at Dover, in the county of Kent and State of Delaware, have invented a new and useful Improvement in Compositions for Stopping Leaks in Cycle-Tires, of which the following is a specification.

Various compositions have been compounded for use in connection with pneumatic tires and like articles to heal them in the event of puncture and increase their period of usefulness, and they attain the desired end in a greater or less satisfactory manner and have not come into general use because the advantages arrived at are not commensurate with the time and expense required for maintaining the composition in working condition, so as to operate instantly and effectively to fulfil the purposes for which it is designed.

The present invention provides an emulsion of a mucilaginous character which will preserve the rubber of the tire or other pneumatic article and heal any punctures, cracks, or crevices and which will maintain a fluid state under all conditions except when exposed to the direct influence of the air, as when passing through a puncture, when it will harden and heal the said puncture.

In preparing the emulsion or self-healing composition the following ingredients are compounded in about the proportions specified, to wit: glucose, six pounds; flour, three pounds; gum-arabic, one and one-half ounces; water, one pint. These constitutent elements are mixed by agitation, and the resultant composition is of a gummy nature and is applied to a pneumatic tire or other inflatable device by being poured or otherwise filled therein. The inner surface of the tire or article is thus coated, and in the event of being punctured the composition passes into the puncture and soon hardens by contact with the atmosphere, thereby healing the tire and preventing the escape of the confined air. The composition, being confined within the tire, does not harden and remains in a fluid condition and acts as a preservative and prevents the escape of the confined air by penetrating any crevice, crack, or puncture that may be formed.

What is claimed is—

The herein described composition for healing pneumatic tires and the like consisting of glucose, flour, gum-arabic, and water in about the proportions specified.

WILLIAM CULVEYHOUSE.
EDWIN S. ANDERSON.

Witnesses:
EDWARD W. MARVEL,
J. H. STEWART.